United States Patent
Jedrzejewski et al.

(10) Patent No.: US 6,647,436 B1
(45) Date of Patent: Nov. 11, 2003

(54) SELECTION APPARATUS AND METHOD

(75) Inventors: Mark J Jedrzejewski, Thornton, CO (US); Mark A Wahl, Windsor, CO (US); Gregory A Standiford, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 542 days.

(21) Appl. No.: 09/630,522

(22) Filed: Aug. 2, 2000

(51) Int. Cl.[7] .............................................. G06F 13/14
(52) U.S. Cl. .................... 710/14; 174/261; 324/207.21; 365/63; 379/399
(58) Field of Search .......................... 710/14; 174/261; 324/207.21; 365/63; 379/399

(56) References Cited

U.S. PATENT DOCUMENTS

| | | | | |
|---|---|---|---|---|
| 4,950,169 A | * | 8/1990 | Martin et al. ................... | 439/44 |
| 5,133,006 A | * | 7/1992 | Khuat ........................... | 379/399 |
| 5,161,411 A | * | 11/1992 | Cruickshank ................ | 73/293 |
| 5,323,341 A | * | 6/1994 | McCormack et al. ......... | 365/63 |
| 5,418,455 A | * | 5/1995 | Takaishi et al. ....... | 324/207.21 |
| 6,274,842 B1 | * | 8/2001 | Rueda-Aguilocho et al. .... | 174/261 |

* cited by examiner

Primary Examiner—Abdelmoniem Elamin
(74) Attorney, Agent, or Firm—Alexander J. Neudeck

(57) ABSTRACT

Two interfaces or operating modes are designed into the hardware and firmware. Selection between these two interfaces, or operating modes, is indicated by the position of a jumper on an IDE/ATAPI-style jumper block. A pull-up resistor and interface type detection signal are connected to a pin on the IDE/ATAPI-style jumper block associated with a jumper that is not monitored by the IDE/ATAPI master/slave selection detect (or other configuration) hardware or used to pull-down or pull-up another jumpered pin on the jumper block. When a jumper is placed between this pin, and a pin used to pull-up or pull-down another jumpered pin the interface type detection signal will be read as being at the pulled-up or pulled-down logic level, respectively. Otherwise, the IDE/ATAPI master/slave selection (or other configuration) detect hardware will function normally.

23 Claims, 1 Drawing Sheet

SELECTION APPARATUS AND METHOD

FIELD OF THE INVENTION

This invention relates generally to computer peripherals and more particularly to ways that computer peripherals having functionality allowing them to communicate using multiple types of hardware interfaces and peripherals with more than one mode of operation.

BACKGROUND OF THE INVENTION

Computer peripherals communicate with other electronics devices of a computer system using hardware interfaces. For example, popular types of interfaces used in many personal computers (PC's) and workstations for communication to and from peripherals are the Universal Serial Bus (USB), IEEE-1394 ("Firewire"), and the AT Attachment Packet Interface (ATAPI). Computer peripherals may also have more than one operating mode. For example, a peripheral may have a normal operating mode that is used most of the time, and a diagnostic operating mode that is used during manufacturing or some other testing period.

Unfortunately, it is desirable that some peripherals be able to select at power-up the type of interface that it is going to be using to communicate. Likewise, it is desirable that some peripherals be able to select their operating mode at power-up. This functionality provides a savings in design, material and inventory costs because only one type of board needs to be designed, manufactured, and warehoused in order to produce peripherals that can communicate with these different types of interfaces or operate in more than one mode. Without this functionality, two or more different peripheral designs built with different configurations of components would have to be stocked and inventoried. This increases the demands on manufacturers to tightly regulate their inventories to ensure enough of the right items are in stock both to build the peripheral, and to deliver the right configuration of the peripheral to customers.

SUMMARY OF THE INVENTION

In a preferred embodiment, the invention provides for the selection between two different interfaces, or device modes, on a single device at power-up. The selection provided by the invention allows a single device design to communicate with different interface types dependent upon the selected interface type. The selection provided by the invention may also allow the device to select between device modes, such as a diagnostic mode and normal operation. Extra switches, extra jumpers, or complicated firmware that tests which interface is active is not necessary with the invention.

A device embodying the invention may have two interfaces designed into the hardware and firmware. Selection between these two interfaces, or a selection of a device mode, is indicated by the position of a jumper on an IDE/ATAPI-style jumper block. A pull-up resistor and selection detect signal are connected to a pin on the IDE/ATAPI-style jumper block associated with a jumper that is not monitored by the IDE/ATAPI master/slave selection (or other type of configuration) detect hardware or used to pull-down or pull-up another jumpered pin on the jumper block. When a jumper is placed between this pin, and a pin used to pull-up or pull-down another jumpered pin the selection detect signal will be read as being at the pulled-up or pulled-down logic level, respectively. Otherwise, the configuration detect hardware will function normally.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
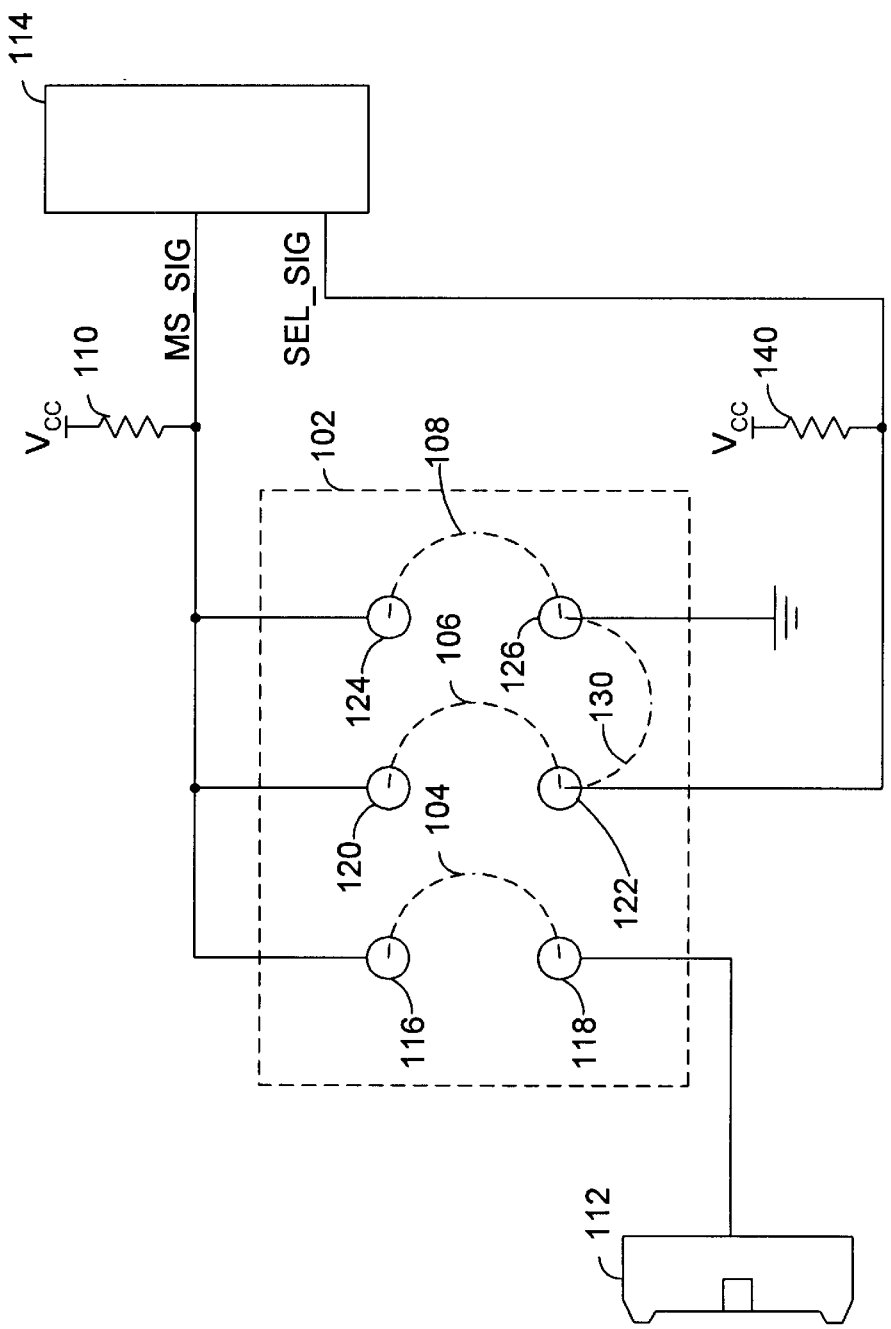
FIG. 1 is an illustration of a circuit and jumper block that can be used to select an interface type, or device mode, and perform interface configuration detection.

FIG. 1 is an illustration of a circuit and jumper block that can be used to select an interface type, or device mode, and perform interface configuration detection. In FIG. 1, box 102 represents an IDE/ATAPI-style jumper block that is comprised of jumper pins 116, 118, 120, 122, 124, and 126. Dotted lines 104, 106, 108, and 130 represent jumper positions that connect jumper pins 116 and 118, 120 and 122, 124 and 126, and 122 and 126, respectively, when a jumper is present in that respective jumper position 104, 106, 108, and 130. In the preferred embodiment, the physical characteristics and dimensions of jumper block 102 and jumper pins 116, 118, 120, 122, 124, and 126 allow the same jumper or one with similar physical and electrical characteristics to be used in any of the jumper positions 104, 106, 108, and 130. Jumper pins 116, 120, and 124 are all connected to signal MS_SIG. MS_SIG is connected to controller 114. When IDE/ATAPI interface mode is present and selected, controller 114 reads the logic state of MS_SIG to determine whether the device should act as the master or as a slave. MS_SIG is pulled-up by resistor 110. Resistor 110 is connected between MS_SIG and a positive supply voltage $V_{cc}$. When a non-IDE/ATAPI interface is present and selected, controller 114 may read the logic state of MS_SIG to determine some other configuration information.

In the embodiment shown in FIG. 1, jumper pin 118 is shown as being connected to IDE/ATAPI connector 112. This connection is to pin 28 (CSEL) of an IDE/ATAPI connector. Jumper pin 122 is connected to signal SEL_SIG. SEL_SIG is connected to controller 114. Controller 114 reads the logic state of SEL_SIG to determine which interface to use. If SEL_SIG is at a high voltage level, then controller 114 knows to use the IDE/ATAPI interface and connector and read MS_SIG to determine whether the device should act as a master or as a slave. If SEL_SIG is at a low voltage level, then controller 114 knows to use a different type of interface such as a USB interface or an IEEE-1394 interface. SEL_SIG is pulled-up by resistor 140. Resistor 140 is connected between SEL_SIG and a positive supply voltage $V_{cc}$. Jumper pin 126 is connected to ground.

In the embodiment shown in FIG. 1, the type of interface, or the state of a configuration bit for selecting an operating mode, is selected via the presence or absence of a jumper between jumper pins 122 and 126 as shown by dotted line 130. If a jumper is present between jumper pins 122 and 126 then signal SEL_SIG is pulled-down through jumper pin 122 and the jumper by grounded jumper pin 126 so that controller 114 will read a low voltage level on SEL_SIG. This indicates that the non-IDE/ATAPI interface should be used or that the device should operate in a different mode. If a jumper is absent between jumper pins 122 and 126, then SEL_SIG is pulled-up by resistor 140 and will be read by controller 114 as being at a high voltage level. This indicates that the IDE/ATAPI interface should be used and the device should operate in a normal operating mode.

In the embodiment shown in FIG. 1, if a jumper is absent between jumper pins 122 and 126, selection of IDE/ATAPI master, slave, or cable select, is accomplished via a jumper placed between jumper pins 116 and 118, 120 and 122, or 124 and 126. The position, or lack of, this jumper determines the state of signal MS_SIG. MS_SIG is read by controller 114 to determine if the device should act as the master or slave. If MS_SIG is low, then the device should act as the master. If the MS_SIG is high, then the device should act as the slave. A pull-up resistor 110 is connected between MS_SIG and a positive supply voltage, $V_{cc}$, such that if nothing is actively pulling MS_SIG down, controller 114 will read a high state and determine that the device should act as a slave.

In the embodiment shown in FIG. 1, if the jumper was placed between jumper pins 116 and 118, as shown by dotted line 104, the IDE/ATAPI master/slave selection would depend upon the IDE/ATAPI cable. Jumper pin 118 is connected to pin 28 of the IDE/ATAPI cable connector 112. If the cable grounds this pin, then this device should act as the master. If the cable leaves this pin open, then the device should act as the slave. This jumper position and functionality may be referred to as cable select.

In the embodiment shown in FIG. 1, if the jumper is placed between jumper pins 124 and 126, as shown by dotted line 108, MS_SIG would be pulled low since jumper pin 126 is connected to ground. This causes controller 114 to read a low state on MS_SIG and determine that the device should act as the master. If the jumper is placed between jumper pins 120 and 122, or no jumper at all is used, MS_SIG is pulled high. When no jumper is used, MS_SIG is pulled high by resistor 110. When a jumper is placed between jumper pins 120 and 122, MS_SIG is pulled high by resistor 110 and resistor 140. Both of these situations cause controller 114 to read a high voltage level on MS_SIG.

The embodiment shown in FIG. 1 illustrates the use of the invention with a device having an IDE/ATAPI interface. However, the invention may be used with other types of interfaces such as USB or IEEE-1394 or on devices without any interfaces.

From the foregoing it will be appreciated that the interface selection and device configuration provided by the invention offers numerous advantages. Interfaces selection is accomplished using a configuration jumper block that is already present to select master/slave mode for an IDE/ATAPI interface or present to select some other configuration information so an additional set of jumper pins does not need to be added. Also, a device incorporating this interface selection or device configuration provides a savings in design, material and inventory costs because only one type of board needs to be designed, manufactured, and warehoused in order to produce peripherals that can communicate with more than one different type of interface, or have more than one operating mode without adding additional jumper pins to a jumper block.

Although a specific embodiment of the invention has been described and illustrated, the invention is not to be limited to the specific forms or arrangements of parts so described and illustrated. The invention is limited only by the claims.

What is claimed is:

1. A selection circuit, comprising:
   a jumper block having a first jumper position and a second jumper position wherein a jumper in said first jumper position sets a first signal to a first logic level; and
   a third jumper position comprised of a first pin that is used by said first jumper position and a second pin that is used by said second jumper position wherein a jumper in said third jumper position sets a second signal to said first logic level.

2. The selection circuit of claim 1 wherein the absence of a jumper in said first jumper position sets said first signal to a second logic level.

3. The selection circuit of claim 1 wherein the absence of a jumper in said third jumper position sets said second signal to said second logic level.

4. The selection circuit of claim 1 further comprising a fourth jumper position wherein a jumper in said fourth jumper position and the absence of a jumper in said first jumper position sets said first signal to a logic level determined by a third pin that is used by said fourth jumper position.

5. The selection circuit of claim 1 wherein the physical characteristics of said jumper block allow the same jumper to be used in said first jumper position, said second jumper position, and said third jumper position.

6. The selection circuit of claim 4 wherein the physical characteristics of said jumper block allow the same jumper to be used in said first jumper position, said second jumper position, said third jumper position, and said fourth jumper position.

7. The selection circuit of claim 6 wherein said jumper block performs IDE/ATAPI master/slave selection.

8. The selection circuit of claim 7 wherein the presence of a jumper in said third jumper position means that an alternative interface that is not an IDE/ATAPI interface is to be used.

9. The selection circuit of claim 8 wherein said alternative interface is a Universal Serial Bus interface.

10. The selection circuit of claim 8 wherein said alternative interface is an IEEE-1394 interface.

11. A method of selection, comprising:
    indicating a first selection by the presence and absence of a jumper in a first jumper position comprised of a first pin and a second pin; and,
    indicating a second selection when said jumper is absent from said first jumper position by the presence and absence of a jumper in a second jumper position comprised of said first pin and a third pin.

12. The method of claim 11 wherein said first selection determines whether an IDE/ATAPI interface is to be used.

13. The method of claim 12 wherein an absence of a jumper in a second jumper position allows IDE/ATAPI slave mode and IDE/ATAPI cable select mode to be selected.

14. The method of claim 13 wherein said IDE/ATAPI slave mode is selected by the presence of a jumper in a third jumper position wherein said third jumper position is comprised of said second pin and a fourth pin.

15. The method of claim 14 wherein said IDE/ATAPI cable select mode is selected by the presence of a jumper in a fourth jumper position and the absence of a jumper in said first jumper position, said second jumper position, and said third jumper position.

16. An IDE/ATAPI selection circuit, comprising:
    a jumper block having at least a master jumper position and a slave jumper position wherein a first pin from said master jumper position and a second pin from said slave jumper position comprise a third jumper position that selects a non-IDE/ATAPI interface.

17. The circuit of claim 16 further comprising a cable select jumper position.

18. The circuit of claim 16 wherein said master jumper position comprises said first pin and a third pin and said slave jumper position comprises said third pin and a fourth pin and said third pin and said second pin are coupled to a master/slave selection signal.

19. The circuit of claim 18 wherein said master/slave selection signal is pulled-up to a first logic level when there is no jumper in said master jumper position.

20. The circuit of claim 19 wherein said master/slave selection signal is pulled down to a second logic level when there is a jumper in said master jumper position.

21. The circuit of claim 20 wherein said second pin is coupled to an interface selection signal that is pulled up to said first logic level when there is no jumper in said third jumper position.

22. The circuit of claim 21 wherein said first pin is connected to a second logic level.

23. The circuit of claim 22 further comprising a cable select jumper position.

* * * * *